May 26, 1964  B. J. LEHMAN  3,134,512
DISPENSING APPARATUS
Filed July 25, 1961
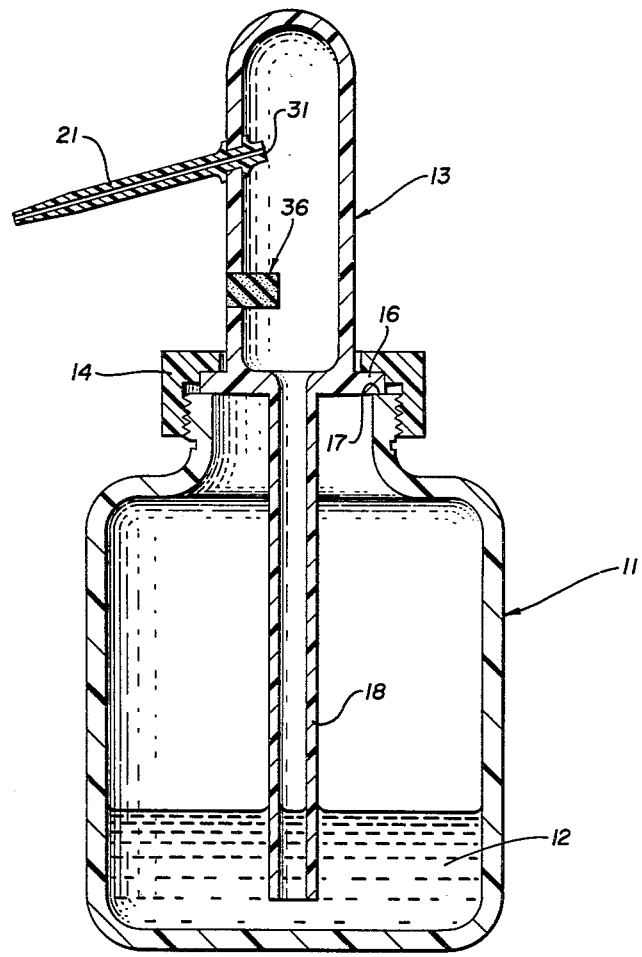
INVENTOR.
Ben J. Lehman
BY *Flehr & Swain*
Attorneys

3,134,512
Patented May 26, 1964

1

3,134,512
DISPENSING APPARATUS
Ben J. Lehman, Palo Alto, Calif., assignor to Beckman Instruments, Inc., a corporation of California
Filed July 25, 1961, Ser. No. 126,639
5 Claims. (Cl. 222—189)

This invention relates generally to a dispensing apparatus for delivering measured amounts of liquid.

One type of prior art pipette includes a deformable reservoir serving to retain liquid to be dispensed, a chamber disposed above said reservoir, and means for transferring liquid between the reservoir and the chamber. A measuring tube adapted to retain a predetermined volume of liquid has one end extending into the chamber. An opening is provided in the chamber so that it may communicate with the surrounds.

In operation, the deformable reservoir is squeezed whereby liquid is forced upwardly into the chamber to submerge the end of the measuring tube. When the end of the measuring tube is submerged, the opening communicating with the surrounds is closed by placing a finger over the same. Pressure is created in the chamber and the liquid is forced into the measuring tube to fill it. The finger is removed from the opening when the tube is filled. A measured amount of liquid is then retained between the meniscuses formed at the ends of the measuring tube. The deformable reservoir is then released and the fluid flows from the chamber back into the reservoir. To dispense the measured amount of liquid retained in the tube, the opening communicating with the surrounds is again closed and the deformable reservoir squeezed whereby pressure is created in the chamber. This pressure urges the liquid outwardly from the measuring tube.

A pipette of the foregoing character requires that the squeezing of the reservoir and placing of the index finger be coordinated. When a dispenser of the foregoing character is used by skilled personnel, no difficulties arise. However, unskilled personnel may find it relatively difficult to coordinate the various motions.

A dispenser of the foregoing character is useful in dispensing drugs, prescriptions, and the like. However, such users would be unskilled. Consequently, such a dispenser is not suitable for use by the general public. The present usefulness is in laboratories where skilled personnel use the dispensing pipette to carry out chemical analyses.

It is a general object of the present invention to provide a dispenser of the foregoing character which may be used by unskilled people.

It is another object of the present invention to provide a dispenser of the foregoing character which includes automatic valve means whereby a liquid may be dispensed by two subsequent deformations of the reservoir, the first serving to fill the measuring tube and the second serving to deliver the known amount of liquid retained in the tube.

It is a further object of the present invention to provide a pipette of the foregoing character which is simple in construction and inexpensive to manufacture.

It is still a further object of the present invention to provide a pipette of the foregoing character which includes novel valving means.

These and other objects of the invention will become more clearly apparent from the following description when taken in conjunction with the accompanying drawing.

The single figure of the drawing shows an elevational view, partly in section, of a dispenser in accordance with the present invention.

2

The pipette illustrated in the drawing includes a deformable reservoir 11 which retains the liquid 12 which is to be dispensed. A chamber 13 is carried by the reservoir 11 and may be secured thereto by the threaded nut 14 which engages the rim of flange 16 formed on the chamber 13 and urges the same against the upper edge 17 of the reservoir neck to form a seal. A tube 18 is provided for communicating between the reservoir 11 and chamber 13 to permit transfer of liquid between the reservoir and chamber into both directions. Means are provided for forcing the liquid upward from the reservoir 11 into the chamber 13. Preferably, the reservoir is deformable whereby by squeezing, pressure is created to drive the fluid up into the chamber 13.

A pipette or measuring tube 21 is carried by the walls of the chamber 13. The pipette is in the form of an elongated tube which has a predetermined length and bore whereby when it is filled, a predetermined volume is retained between the meniscuses formed at the two ends.

In accordance with the present invention, there is provided an automatic valve means which performs the functions previously done with the forefinger. The novel valve means comprises a porous member 36 which communicates between the exterior and interior of the chamber 13. The porous member is of such porosity that it allows air to flow freely through it. However, it is made of a material that will not allow the liquid which is to be dispensed to flow therethrough. The porous member is disposed below the end 31 of the pipette 21. Thus, when the deformable reservoir is deformed, liquid will flow upwardly in the tube 18 and air will flow outwardly both through the porous member 36 and through the pipette passage. However, when the member 36 is submerged, the air will flow outwardly only through the pipette 21. When the end 31 of the pipette is submerged, fluid will flow outwardly into the pipette and fill the same as previously described. Upon release of the reservoir, the porous member 36 allows air to flow inwardly into the chamber and allow the fluid to be transferred back into the reservoir. Upon a subsequent deformation of the reservoir, fluid will rise, again cover the member 36, at which time pressure will be built up and the liquid will be dispensed from the pipette.

The member 36 must be such that the pressure required to remove liquid from its pores is less than that required to remove liquid from the pipette whereby when the reservoir is released, air flows inwardly through the member 36 without disturbing the fluid in the measuring pipette 21.

Thus, it is seen that there is provided a dispensing apparatus which is simple in construction and easy to operate.

I claim:

1. A dispensing apparatus for the delivery of measured volumes of liquid comprising a pipette of predetermined length and cross-sectional area whereby at its full state it will retain a predetermined volume of liquid, a reservoir serving to retain liquid, means forming a chamber, communication means for transferring the liquid between the reservoir and chamber, said pipette having one end extending into the chamber, valve means providing communication between the interior of the chamber and the surrounds to allow air to travel into the chamber, means for applying pressure in said reservoir to cause the liquid to rise into the chamber and submerge said one end of the pipette, said valve means being constructed and arranged to be closed automatically at least when said one end of the pipette is submerged to thereby create pressure within the chamber and cause the liquid to flow outwardly into the pipette and fill the same, said valve means serving to open upon removal of said pressure to allow air to flow into the chamber and the liquid in the chamber to flow downwardly into the reservoir whereby subsequent application of said pressure means purges said pipette of liquid remaining therein.

2. Apparatus as in claim 1 wherein said valve means comprises a porous member which permits the free flow of air therethrough but does not permit the flow of liquid therethrough and which requires a differential pressure which is less than the pressure required to withdraw fluid from the pipette to allow air to flow through the same after it has been contacted with the liquid, said member being disposed to provide communication between the interior and exterior of the chamber below said one end of the pipette.

3. A dispensing apparatus for the delivery of measured volumes of liquid comprising a pipette of predetermined length and cross-sectional area whereby at its full state it will retain a predetermined volume of liquid, a reservoir serving to retain liquid, means forming a chamber, communication means for transferring the liquid between the reservoir and chamber, said pipette having one end extending into the chamber, valve means providing communication between the interior of the chamber and the surrounds to allow air to travel into the chamber, said reservoir being deformable to reduce the volume of said reservoir whereby upon deformation of the same the liquid is caused to rise into the chamber and submerge said one end of the pipette, said valve means being constructed and arranged to be submerged and automatically closed at least when said one end of the pipette is submerged to thereby create pressure within the chamber to cause the liquid to flow outwardly into the pipette and fill the same, said valving means serving to open upon removal of said pressure to allow air to flow into the chamber and the liquid in the chamber to flow downwardly into the reservoir whereby subsequent application of said pressure means purges said pipette of liquid remaining therein.

4. Apparatus as in claim 3 wherein said valve means comprises a hydrostatically controlled air vent.

5. Apparatus as in claim 3 wherein said valve means comprises a porous member which permits the free flow of air therethrough but does not permit the flow of liquid therethrough and which requires a differential pressure which is less than the pressure required to withdraw fluid from the pipette to allow air to flow through the same after it has been contacted with the liquid and the liquid has receded from the surface of said porous member, said member being disposed to provide communication between the interior and exterior of the chamber below said one end of the pipette.

References Cited in the file of this patent
UNITED STATES PATENTS

| | | |
|---|---|---|
| 2,423,173 | Brady et al. | July 1, 1947 |
| 2,804,995 | Fee | Sept. 3, 1957 |
| 2,974,528 | Sanz | Mar. 14, 1961 |